Jan. 17, 1956

M. M. SEELOFF ET AL  2,730,995
PNEUMATIC ACTUATION OF MACHINE ELEMENTS, PARTICULARLY
RESISTANCE WELDING ELECTRODES

Filed Oct. 13, 1949  3 Sheets-Sheet 1

Inventor
MELVIN M. SEELOFF
HANS H. HANSEN

By Francis J. Klempay,
Attorney.

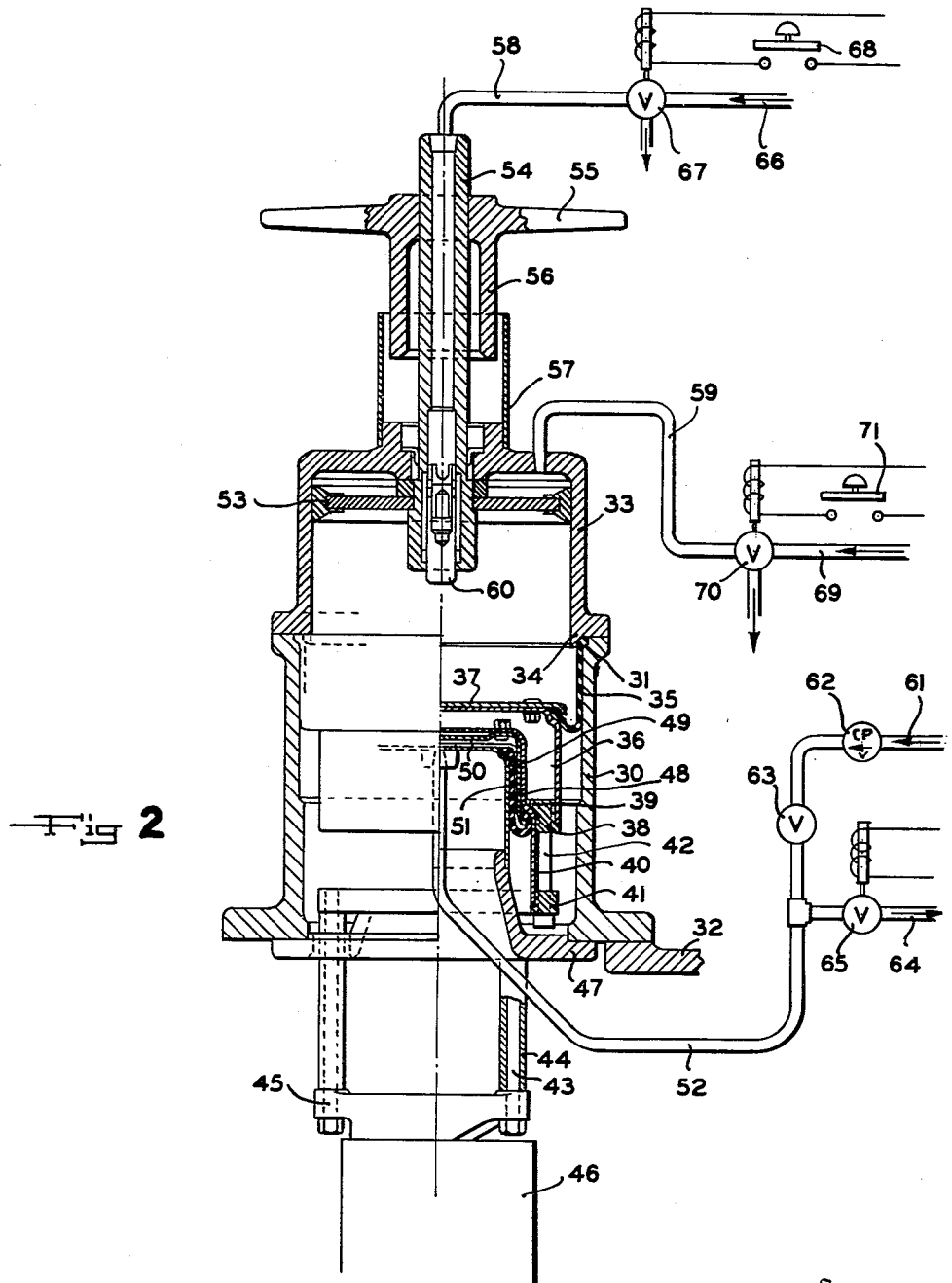

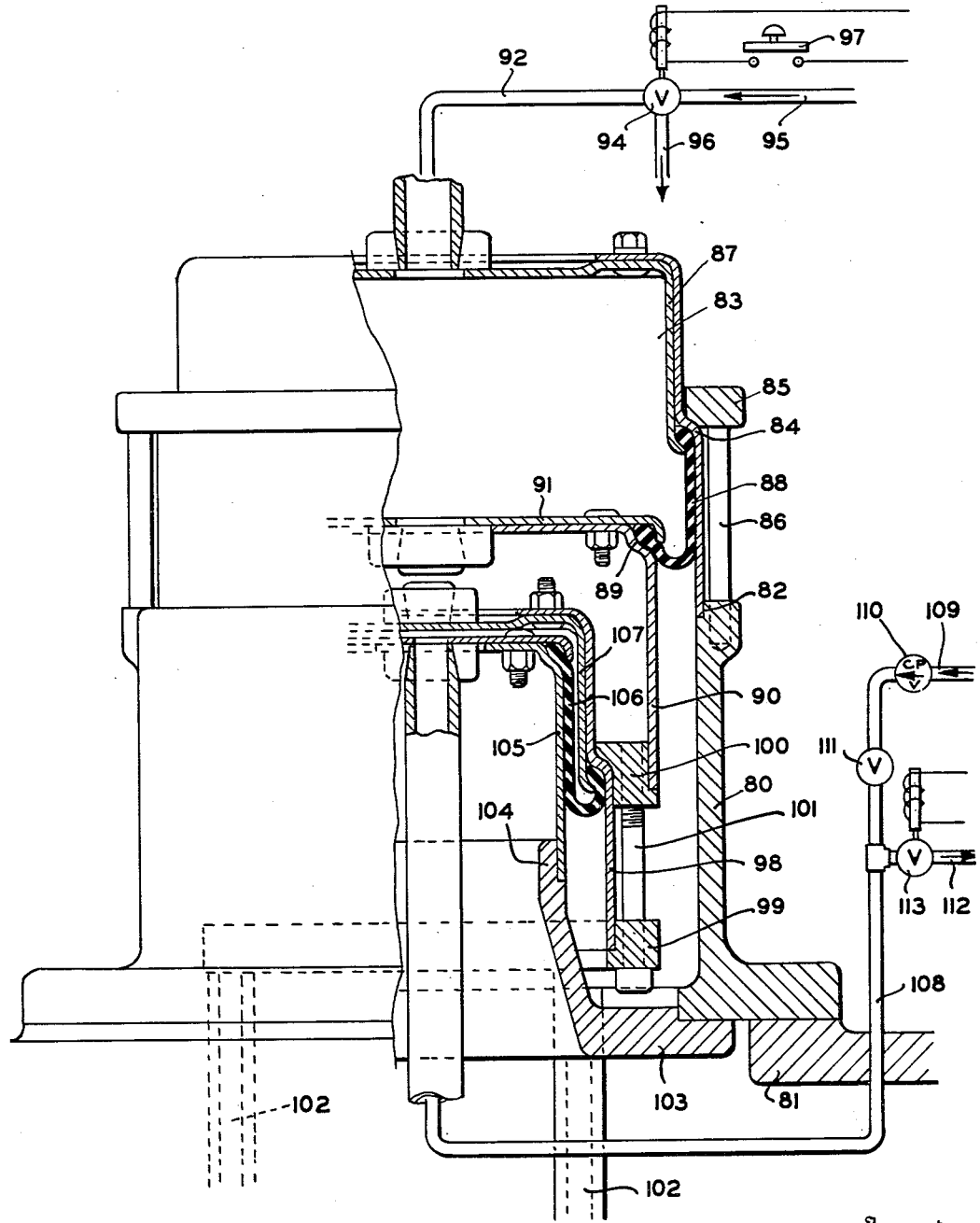

United States Patent Office 2,730,995
Patented Jan. 17, 1956

2,730,995

PNEUMATIC ACTUATION OF MACHINE ELEMENTS, PARTICULARLY RESISTANCE WELDING ELECTRODES

Melvin M. Seeloff and Hans Henning Hansen, Warren, Ohio, assignors to The Taylor-Winfield Corporation, Warren, Ohio, a corporation of Ohio Application October 13, 1949, Serial No. 121,204

9 Claims. (Cl. 121—48)

This invention relates to improved but simplified pneumatic actuating means for machine elements and more particularly to improved apparatus for moving and applying pressure through connecting devices in a sensitive and frictionless manner whereby the movement of said devices as well as the pressure or force exerted therethrough can be accurately controlled. Further, the invention seeks to provide a highly controllable pneumatic actuating assembly which, while being substantially frictionless in operation and susceptible to widely varying combinations in use, is of extremely light weight so as to add a minimum of inertia to the connected devices to be operated whereby movement response of the devices is uninterrupted. Pneumatic actuating systems of the frictionless type are advantageous in resistance welding apparatus, for example, where it is desired that the electrodes move inwardly or toward each other immediately upon softening of the metal by the heating effect of the current to give a dense weld and where it is desired, in many applications, to suddenly exert an increased forging pressure to the work at a predetermined time during the welding cycle. However, there has been no practical system for applying full pneumatic operation to the movable electrode—i. e., a system of the frictionless type wherein the principal air motor is operative to retract the electrode and wherein provision is made for applying the increased forging pressure at a desired time during the welding cycle—and it is accordingly the primary object of the present invention to provide an improved yet simplified apparatus for accomplishing these various objects.

In the actuation of certain elements, such as resistance welding electrodes, it is desirable to provide a normally short range of operation to achieve speed in repetitive actuations while yet providing for the ready full retraction of the element to facilitate work manipulation, for example, and it is another object of the present invention to provide an improved yet simplified pneumatic actuator of the frictionless type for a machine element which is normally operative through a predetermined short range but in which the length of the stroke may be readily and substantially instantaneously lengthened if desired to provide for a full retraction of the element. A more specific object of the invention is the provision of apparatus having the characteristics enumerated in which provision is made for readily increasing the pressure exerted on the connected machine element at a predetermined time during a cycle of operation.

Yet another object of the invention is the provision of an improved pneumatic actuating motor capable of varied use in the manner outlined above wherein the principal component elements may be made by economical stamping and molding operations and wherein a standardized set of components may be utilized to assemble motors of different capacities.

The above and other objects and advantages of the invention will become apparent upon consideration of the following detailed specification and the accompanying drawing wherein there is disclosed certain representative embodiments of the invention as applied particularly to resistance welding machines.

In the drawing:

Figure 2 is a front elevation, partly in section, of a modified form of operating head for an electrode of a resistance welding machine utilizing the principles of our invention; and Figure 3 is a front elevation, partly in section, of a further modified form of operating head for a resistance welder constructed in accordance with the principles of our invention.

Figure 1:
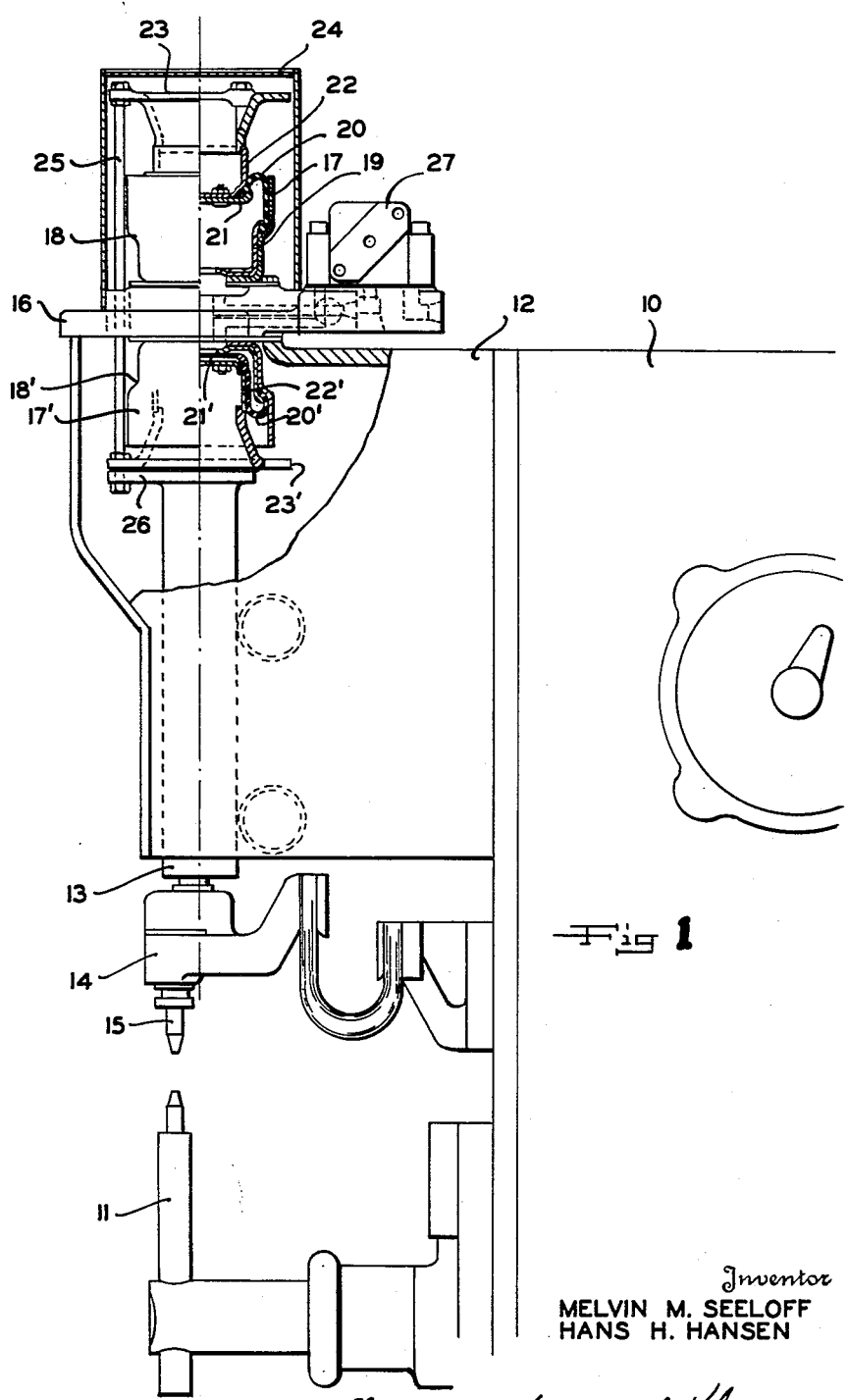
Figure 1 is a fragmentary side elevation, partly in section, of a spot welder utilizing the principles of our invention in the mechanism for raising and lowering the upper electrode machine.

Referring to the drawing in detail and first to Figure 1, the reference numeral 10 designates the frame of a resistance welding machine which mounts a normally fixed electrode 11 and a bracket 12 carrying a vertically guided quill 13 to the lower end of which is attached a carrier 14 for the upper or movable electrode 15. Rigidly mounted on the bracket 12 is a plate 16 mounting on its upper surface a cup-like fitting 17 having an outwardly flaring shoulder 18. Slidably received in the lower portion of the cup 17 is an inwardly flanged ring 19 having an outwardly flaring upper end spaced upwardly from the shoulder 18. Clamped between the shoulder 18 and the outwardly flaring upper end of the fitting 19 is the lower peripheral bead of a flexible diaphragm 20, the upper peripheral bead of which is securely clamped by means of plate 21 to a lower circumferential groove formed in a cup member 22. As shown, the plate 21 is imperforate while the members 17 and 19 are centrally apertured so that air may be admitted into the space bounded by the diaphragm 20 through a suitable bore formed in the plate structure 16, it being understood that a suitable airtight joint is provided between the lower edge of the cup member 17 and the upper surface of the plate structure 16.

An outwardly flaring spider 23 housed within an outer cover 24 is rigidly attached to the upper member of the cup 22 and rigidly connected to the outer rim of the spider 23 and depending downwardly therefrom is a plurality of circumferentially spaced tie rods 25 to the lower ends of which are rigidly clamped a spider 23' which is identical with the spider 23 and a second spider 26 which is rigidly mounted on the upper end of the quill 13. As shown, the spider 23' is rigidly connected to the lower edge of a cup 22' which has clamped thereto by means of a plate 21' the upper peripheral bead of a flexible ring-type of diaphragm 20'. The lower peripheral bead of the diaphragm 20' is clamped against a shoulder 18' of a cup member 17' and it will be apparent that the air motor comprised of the parts 17' through 23' is identical with the first described air motor comprised of the parts 17 through 23.

The cup 17' is provided with a centrally disposed aperture so that air passing through a suitable bore, not shown, in the plate 16 may be admitted to and exhausted from the space in the lower air motor immediately above the clamp plate 21'. To complete the assembly a solenoid operated air valve 27 may be mounted on the plate structure 16 to admit air under pressure to one of the end motors while exhausting air from the other of the air motors and vice versa whereby the quill 13 and consequently the upper electrode 15 may be moved upwardly and downwardly as desired.

In the embodiment of the invention shown in Figure 2 a cylindrical housing 30 having an internal annular recess 31 at its upper edge is rigidly mounted on the machine frame 32. Rigidly clamped to the upper end of the housing is a cylinder 33 having an internally lipped lower end as shown at 34 to clamp the upper peripheral bead of a ring type of diaphragm 35 in the annular recess 31. The lower bead of the diaphragm 35 is clamped in an annular recess formed in the upper edge of an inverted cup member 36 by means of an imperforate clamp plate 37. Rigidly secured in the lower end portion of the cup 36 is a ring 38 having an internal shoulder 39 at its upper end to engage over an external shoulder formed in the side wall of an inverted cup 40 substantially midway between the top and bottom thereof. Engaging the lower edge of the cup 40 is a shouldered ring 41 which is clamped against the bottom edge of the cup 40 by means of a number of circumferentially spaced tie bolts 42 which interconnect the rings 38 and 41. In this manner the cups 36 and 40 are rigidly connected together and the ring 41 is rigidly connected to both of them.

Rigidly secured to the ring 41 by means of the clamping studs 43 and the spacing sleeves 44 is a spider 45 which carries a depending slide or quill 46. In a practical application of the equipment the lower end of the quill 46 mounts the movable electrode, not shown, of the welding machine in substantially the manner shown in the embodiment of Figure 1.

The supporting members 43, 44 extend upwardly through suitable apertures formed in a collar or spider member 47 and, as shown, the collar or spider member 47 extends upwardly and inwardly of the lower end portion of the cup 40 and rigidly mounts at its upper end an inverted cup member 48. An annular recess is formed at the upper end of the cup 48 to receive the upper peripheral bead of a flexible ring-type of diaphragm 49 which is clamped in this recess by a clamp plate 50. The lower peripheral bead of the diaphragm 49 is clamped in the internal shoulder of the cup 40 by means of a cup 51 which is formed with an outwardly flaring lower edge to engage such bead.

A flexible conduit 52 supplies air under pressure to the space immediately below the horizontal center portion of the cup 40 whereby the latter as well as the quill 46 may be moved upwardly upon the admission of air under pressure to the conduit 52, it being observed that the opposing wall of the expansible chamber thus provided comprised of the clamp plate 50 and a portion of the diaphragm 49 is fixed with respect to the machine frame by means of the spider-like fitting 47.

Slidably received in the cylinder 33 is a piston 53 which is rigidly carried by a hollow upwardly extending piston rod 54. Screw-threadedly received on the upper end portion of the rod 54 is a wing nut 55 having a depending flange 56 which is adapted to abut an upwardly extending boss 57 formed on the cylinder 33. It will thus be apparent that the lowermost position of the piston 53 will be determined by the adjustment of the wing nut 55 on the rod 54. Connected with the outer end of the rod 54 is a flexible conduit 58 which admits air under pressure to the space in cylinder 33 below the piston 53. Another conduit 59 is employed to admit air pressure into the cylinder 33 above the piston 53. It should also be observed that the lower end of rod 54 is provided with a bumper block 60 arranged to be engaged by the plate 37 to limit the upward movement of this plate and of the quill 46 during operation of the assembly, as will be apparent more fully below.

The apparatus of Figure 2 is well suited for incorporation in fully automatic machines but since specific machine control circuits are not part of the present invention we have shown only simplified schematic arrangements for controlling the admission of air to the respective chambers of the assembly for the purpose of illustrating the characteristics of the assembly. Thus, air is supplied to the conduit 52 from a suitable source 61 in which is located a pressure regulator 62 and a normally open needle valve 63. Connected directly with the conduit 52 is an exhaust line 64 controlled by a solenoid operated valve 65. When the valve 65 is closed the pressure in conduit 52 builds up according to the regulation of valve 62 and the application of this pressure in the space below the horizontal wall of the cup 40 applies an upward force tending to raise the quill 46. This opposing force may be quickly withdrawn by opening the valve 65 to allow the air pressure to escape through the exhaust conduit 64.

Conduit 58 may be supplied with air under pressure from a suitable source 66 under the control of a three-way valve 67. An operating solenoid under the control of a switch 68 may be provided for the valve 67 and the operation of the assembly may be such that upon the switch 68 being open the conduit 58 is open to exhaust while the conduit 66 is closed and upon the switch 68 being closed the supply conduit 66 is connected with the conduit 58 whereby air under pressure is admitted into the expansible chamber immediately above the plate 37. Air is admitted to the conduit 59 from a suitable supply conduit 69 under the control of a solenoid-operated three-way valve 70 which in turn is controlled by a switch 71. The hook-up and control of the valve 70 may be such that upon the switch 71 being open the conduit 69 is connected with the conduit 59 to maintain the piston 53 and bumper block 60 in lower adjusted position. For this purpose, a higher pressure is furnished the conduit 69 than the conduit 66 so that during all normal operation the block 60 will be maintained in lower position to thereby limit the length of stroke of the quill 46. Normal up and down movement of the quill within this restricted range may be effected by opening and closing the switch 68 but in some applications it may be desirable to correlate the passage of air through the conduits 52 and 58 by means of a four-way valve as is well known in the art. Regardless of the specific controls utilized, when it is desired to fully retract the quill 46 the switch 71 may be closed to close off the supply conduit 69 and to connect the conduit 59 with the exhaust whereby the piston 53 will raise to retract the stop of the bumper block 60. This allows the cup 40 and the interconnected plate 37 to move far upwardly under the pressure furnished by the conduit 52.

During normal operation of the apparatus of Figure 2 with the piston 53 in lowermost adjusted position the actuation of valve 67 to admit fluid pressure in the upper expansible chamber immediately above the plate 37 will cause downward movement of the quill 46 against the back pressure developed in the lower expansible chamber. This back pressure is a function of the smaller effective area of the lower chamber and of the pressure furnished the conduit 52 and if and when it is desired to suddenly release this back pressure the same may be accomplished by opening the discharge valve 65. If it is desired to limit the extent of the back pressure a relief valve, not shown, opening to the atmosphere may be connected with the conduit 52.

In the embodiment of the invention shown in Figure 3 the adjustable stroke feature of Figure 2 is eliminated. In this embodiment there is provided a cylindrical base 80 adapted to be rigidly secured to the machine frame 81 and having at its upper edge an internal annular recess 82 adapted to snugly receive the lower edge portion of an inverted cup member 83. As shown, the cup member 83 is shouldered outwardly at 84 and bearing against this shoulder is a ring 85 which is drawn downwardly by screws 86 engaging the upper end of the base 80 whereby the cup 83 is securely clamped onto the top of base 80. Slidably received in the upper end portion of the cup 83 is an inner cup 87, the lower edge of which is flared outwardly slightly below the shoulder 84 to clamp therein the upper peripheral bead of a ring-like flexible diaphragm 88. The lower peripheral bead of the diaphragm 88 is clamped in an annular recess 89 formed in the upper edge of an inverted cup 90 by means of a flanged clamping plate 91. The expansible chamber thus provided is arranged to be furnished with air under pressure by means of a conduit 92 leading from a three-way valve 94 which, in turn, is also connected with an air supply conduit 95 and an exhaust conduit 96. Valve 94 may have an operating solenoid, as shown, controlled by a switch 97 and the arrangement of the assembly may be such that upon closure of the switch air under pressure is admitted into the expansible chamber and upon opening of the switch the chamber is connected with the exhaust 96.

The assembly of Figure 3 utilizes another cup 98 which is identical with the cup 83 but smaller in size and the lower edge portion of cup 98 is received in an annular recess formed in a clamping ring 99. A further clamping ring 100 has an inwardly directed flange to overlie the shoulder on cup 98 and an outwardly directed recess to snugly receive the lower edge portion of the cup 90. A rigid interconnection is made between the parts 90 and 100 and the two rings 99 and 100 are pulled together by the tie bolts 101. Depending from the ring 99 is a plurality of circumferentially spaced tie bolts 102 which may carry at their lower ends a quill, not shown, or other slidable machine element in the manner disclosed in Figure 2.

The connectors 102 extend vertically through suitable apertures formed in a ring-like spider fitting 103 which is rigidly carried about its outer edge by the base 80 and which has an inwardly and upwardly extending cylindrical portion 104 having an annular recess in its upper edge to snugly receive the lower edge portion of an inverted cup member 105. Clamped in an annular recess formed in the upper edge of the cup 105 is the upper peripheral bead of a second ring-like flexible diaphragm 106 and the lower peripheral bead of this diaphragm is clamped in the shouldered offset of the cup 109 by means of the lower outwardly flaring edge of a cup member 107 which is slidably received in the upper portion of the cup 98. There is thus provided a second expansible chamber having a fixed wall provided by the clamping plate on the cup 105 and a movable wall formed by the cup 107. Air under pressure may be furnished this chamber by a conduit 108. Coupled with the conduit 108 is a supply conduit 109 in which is positioned a pressure regulating valve 110 and a restriction valve 111. Also coupled with the conduit 108 is an exhaust conduit 112 in which is located a solenoid operated valve 113.

The operation of the assembly of Figure 3 may be readily understood by assuming first that the motor has completed its operating or downward stroke and the switch 97 has been opened whereupon the air in the upper chamber is being bled off through exhaust conduit 96 while air is being supplied to the lower chamber through conduit 109, valves 110 and 111, and conduit 108. The operating rods 102 will fully retract preparatory to the next cycle of operation. Now upon the closing of switch 97 air under pressure will be re-admitted to the upper chamber and the parts 90, 91, 98, 99 and 100 will move downwardly as a unit at a speed determined by the rate of filling of the upper chamber and with a force determined by the relative pressures maintained in the upper and lower chambers and by the effective relative areas of the upper and lower chambers. In our construction the friction and inertia of the moving parts is at a minimum. If it is desired to suddenly increase the downward thrust exerted by the motor during this operating cycle the valve 113 may be rapidly opened at a desired time to rapidly exhaust the lower chamber, thereby withdrawing the opposing force exerted by the air in the lower chamber. A relief valve, not shown, may be connected with the conduit 108 to limit the back pressure developed in the lower chamber as will be understood and, further, as stated above other control apparatus than that shown by way of example may be utilized to control the operation of the motor, the present invention being concerned primarily with the feature of construction of the motor.

It should be understood that the double-acting pneumatic motor of Figure 1 may readily be controlled, if desired, in the manner of Figures 2 and 3 so that in each of the embodiments herein disclosed there is provided a substantially frictionless pneumatic actuator for a machine element or the like wherein the element may be positively moved in either direction and wherein the pressure or force exerted by the motor in one direction may be very substantially increased by withdrawing the air pressure exerted in an opposing expansible chamber. Of special importance, however, is the construction of the motors whereby the same are light in weight to keep inertia to a minimum, and of economical and inter-changeable design. Most of the parts are simply stampings and drawings which may be used in different relations as illustrated in the drawings. Moreover, because of the identity in shape but difference in size of many of the parts it is possible to readily assemble units of different capacity out of a limited range of sizes of the parts. For example, assuming that the unit of Figure 3 is of largest capacity a unit of smaller capacity may be assembled by using a part like cup 98 as the outermost cup (corresponding in positional relation to the cup 83), a cup like part 105 as the outer wall of the movable barrier (corresponding in positional relation to the member 90), etc.

Since many changes may be made in the illustrated embodiments of the invention without departing from the spirit or scope thereof, reference should be had to the appended claims in determining the scope of the invention.

We claim:

1. In a double-acting pneumatic motor a vertically disposed outer cylinder closed at its upper end, a spider member secured to the open lower end of said outer cylinder, a cup-shaped member supported at its open end on said spider member and positioned within said outer cylinder, a movable wall comprising a pair of spaced nested concentric cup-shaped members positioned concentrically intermediate said first mentioned cup-shaped member and said outer cylinder, a first ring-like flexible diaphragm having its outer peripheral edge secured to the inner surface of said outer cylinder and its inner peripheral edge secured to the upper end of the outer surface of said movable wall, a second ring-like flexible diaphragm having its inner peripheral edge secured to the upper end of said first mentioned cup-shaped member and its outer peripheral edge secured to the inner surface of the innermost of said pair of cup-shaped members, and mechanical connecting means rigidly secured to said movable wall and depending downwardly through said spider member.

2. In a double-acting pneumatic motor a vertically disposed cylindrical base open at top and bottom and having an annular recess in the inner surface of its upper edge, an inverted cup having its lower edge portion seated in said recess, a spider member secured to the open lower end of said base, an inverted cup-shaped member supported at its open end on said spider member and positioned within said base, a movable wall comprising a pair of spaced nested concentric cup-shaped members positioned concentrically intermediate said first mentioned cup-shaped member and said base, a first ring-like flexible diaphragm having its outer peripheral edge secured to the inner surface of said cup and its inner peripheral edge secured to the upper end of the outer surface of said movable wall, a second ring-like flexible diaphragm having its inner peripheral edge secured to the upper end of said first mentioned cup-shaped member and its outer peripheral edge secured to the inner surface of the innermost of said pair of cup-shaped members, and mechanical connecting means rigidly secured to said movable wall and depending downwardly through said spider member.

3. In a double-acting pneumatic motor for rectilinearly guided machine components, a first fixed cylinder-like member having an open and closed end, a spider member mounted at the open end of said first cylinder-like member, a second fixed cylinder-like member carried by said spider in concentric relation to said first cylinder-like member, said second cylinder-like member being of smaller diameter than said first cylinder-like member, a movable wall comprising rigidly connected first and second cup-shaped members, said first cup-shaped member being of larger diameter than said second cup-shaped member and being positioned in nested concentric relation to said first cylinder-like member, said second cup-shaped member being positioned in nested concentric relation to said second cylinder-like member, a first ring-like flexible diaphragm connecting said first cylinder-like member and said first cup-shaped member, a second ring-like flexible diaphragm connecting said second cylinder-like member and said cup-shaped member, and means connecting said movable wall and extending outwardly of said motor through said spider for interconnection with a guided machine component.

4. In a double-acting pneumatic motor for rectilinearly guided machine components, a large diameter fixed cylinder-like member having an open and a closed end, a small diameter fixed cylinder-like member positioned in nested concentric relation to said large diameter cylinder-like member, a cup-shaped hollow movable wall nested intermediate said cylinder-like members, said movable wall having substantially spaced inner and outer side walls, a first ring-like flexible diaphragm connecting said large diameter cylinder-like member and said outer side wall, a second ring-like diaphragm member connecting said small diameter cylinder-like member and said inner side wall, means connecting said movable wall and projecting outwardly of said motor for interconnection with a machine component, said movable wall comprising a pair of stamped cup-shaped shells, one of said shells comprising said inner side wall and the other of said shells comprising said outer side wall, and means including a ring shaped member secured to the lower side wall portions of said shells to maintain said shells in spaced concentric relation.

5. Apparatus according to claim 4 further characterized by said means projecting outwardly of said motor comprising a plurality of circumferentially spaced rigid members secured to said ring and extending longitudinally of said motor.

6. In a double-acting pneumatic motor for rectilinearly guided machine components, a large diameter fixed cylinder-like member having an open and a closed end, a small diameter fixed cylinder-like member positioned in nested concentric relation to said large diameter cylinder-like member, a cup-shaped hollow movable wall nested intermediate said cylinder-like members, said movable wall having substantially spaced inner and outer side walls, a first ring-like flexible diaphragm connecting said large diameter cylinder-like member and said outer side wall, a second ring-like diaphragm member connecting said small diameter cylinder-like member and said inner side wall, means connecting said movable wall and projecting outwardly of said motor for interconnection with a machine component, said cylinder-like members and said inner and outer side walls comprising stamped cup-shaped shells, said shells being of similar relative proportions and of graduated size and being oriented in the same direction, and said means connecting said movable wall comprising a rigid member secured to the intermediate nested pair of said graduated shells.

7. Apparatus according to claim 6 further characterized by the smallest of said graduated shells being rigidly mounted by a spider having circumferentially spaced openings therein, and a plurality of circumferentially spaced longitudinally disposed members connecting said rigid member and projecting through said openings for interconnection with a guided machine component.

8. A fluid-pressure-operated actuator for a rectilinearly guided machine component comprising a pair of spaced cup-shaped members secured in fixed positions in axial alignment with the direction of movement of the machine component, a second pair of spaced cup-shaped members having nested relation with respect to said first mentioned cup-shaped members and axially aligned with said first mentioned cup-shaped members, rigid mechanical means interconnecting the outer peripheral edges of said second pair of cup-shaped members to maintain the same in spaced relation with respect to each other and to provide a rigid mechanical driving connection with said rectilinearly guided machine component, and a pair of spaced ring-like flexible diaphragms one of which has one of its peripheral edges secured to one of said first mentioned cup-shaped members and its other peripheral edge secured to one of said second mentioned cup-shaped members, the other of said diaphragms having one of its peripheral edges secured to the other of said first mentioned cup-shaped members and having the other of its peripheral edges secured to the other of said second mentioned cup-shaped members, the arrangement being such that said members and diaphragms form two opposing expansible chambers whereby said second pair of cup-shaped members may be moved in either direction under pressure of air in said chambers to reciprocate said machine component in a frictionless and low inertia manner.

9. Apparatus according to claim 8 further characterized by said first mentioned cup-shaped members being divergently related, a horizontally disposed rigid member positioned between and mounting said first mentioned cup-shaped members, said second mentioned cup-shaped members being divergently related and nested in said first mentioned cup-shaped members, and fluid passages in said horizontally disposed member whereby fluid may be admitted into either or both of said first mentioned cup-shaped members.

References Cited in the file of this patent

UNITED STATES PATENTS

| 333,507 | Donaldson | Jan. 5, 1886 |
|---|---|---|
| 368,089 | Hinds | Aug. 9, 1887 |
| 678,807 | Whitfield | July 16, 1901 |
| 1,414,835 | Spohrer | May 2, 1922 |
| 1,751,277 | Karibo et al. | Mar. 18, 1930 |
| 1,912,777 | Kuskin | June 6, 1933 |
| 2,209,844 | Otto | July 30, 1940 |
| 2,358,826 | Purat | Sept. 26, 1944 |

FOREIGN PATENTS

| 14,235 | Germany | July 1, 1881 |
|---|---|---|
| 3,058 | Great Britain | Feb. 11, 1884 |
| 513,977 | Great Britain | Oct. 26, 1939 |